United States Patent [19]

Lamb

[11] Patent Number: 5,590,474
[45] Date of Patent: Jan. 7, 1997

[54] FLANGE BOLT HOLE ALIGNMENT PIN

[75] Inventor: Douglas E. Lamb, Newport News, Va.

[73] Assignee: Newport News Shipbuilding and Dry Dock Company, Newport News, Va.

[21] Appl. No.: 512,590

[22] Filed: Aug. 8, 1995

[51] Int. Cl.$^6$ .................. G01B 5/25; B23P 19/04
[52] U.S. Cl. .................. 33/645; 33/520; 33/533; 33/644; 29/271; 29/464
[58] Field of Search .................. 33/645, 520, 529, 33/533, 613, 644, 542, 543, 544.4; 29/271, 464, 466, 467, 468

[56] References Cited

U.S. PATENT DOCUMENTS

| | | | |
|---|---|---|---|
| 2,314,582 | 3/1943 | Gerich | 33/645 |
| 2,370,017 | 2/1945 | Delvaux, Sr. | 33/644 |
| 2,484,801 | 10/1949 | Anderson | 33/644 |
| 2,963,090 | 12/1960 | Cole et al. | 33/645 |
| 3,389,472 | 6/1968 | Poland | 33/520 |
| 3,685,126 | 8/1972 | Kane | 29/254 |
| 3,725,993 | 4/1973 | Siler | 29/271 |
| 3,762,068 | 10/1973 | Clay . | |
| 3,822,481 | 7/1974 | Doan | 33/371 |
| 4,383,368 | 5/1983 | Morawski et al. | 33/529 |
| 4,662,055 | 5/1987 | VanMeter | 33/613 |
| 4,742,618 | 5/1988 | Watkins et al. | 33/299 |
| 4,773,164 | 9/1988 | Taylor et al. | 33/520 |
| 4,982,489 | 1/1991 | Haugen | 33/645 |

FOREIGN PATENT DOCUMENTS 248766  12/1987  European Pat. Off. .................. 33/644

Primary Examiner—Christopher W. Fulton
Attorney, Agent, or Firm—C. N. Rosen

[57] ABSTRACT

A bolt hole alignment pin for assisting in aligning mating flanges in piping systems comprises a head, a first portion for slip fit with the bolt holes in the flanges, a second portion for centering a gasket between the mating flanges, and a third portion offset from the second portion for providing a cam action when the head is turned to bring the flanges into exact alignment.

26 Claims, 3 Drawing Sheets

FLANGE BOLT HOLE ALIGNMENT PIN

BACKGROUND OF THE INVENTION

This invention relates generally to mating and aligning piping or rod flanges, and more particularly to a bolt hole alignment tool for assisting in the alignment process of piping flanges prior to final installation of bolts and nuts. This invention allows the alignment of mating flanges with a greater precision and without the use of leveraging tools typically required in the prior art. It gives the individual user the ability to quickly fit-up most joints without additional assistance even in confined spaces, thereby minimizing delays, especially those resulting from waiting for support personnel.

SUMMARY OF THE INVENTION

The bolt hole alignment pin of the present invention eliminates much of the difficulty encountered using the prior art methods of aligning flanged joints. The preferred embodiment of this tool is especially useful when joints require the insertion of gaskets which must be properly centered between two mating flanges. The bolt hole alignment pin includes a head, shaped for engagement by a wrench; a first portion of sufficient diameter to allow a slip fit with the bolt holes of the flanges; a second portion of smaller diameter for centering the gasket; a third portion of even smaller diameter which is offset from the second portion and tapered to a blunt point. This offset configuration causes the third portion to act as a cam when the head is turned, thus bringing the two mating flanges into alignment.

DETAILED DESCRIPTION

Figure 1:
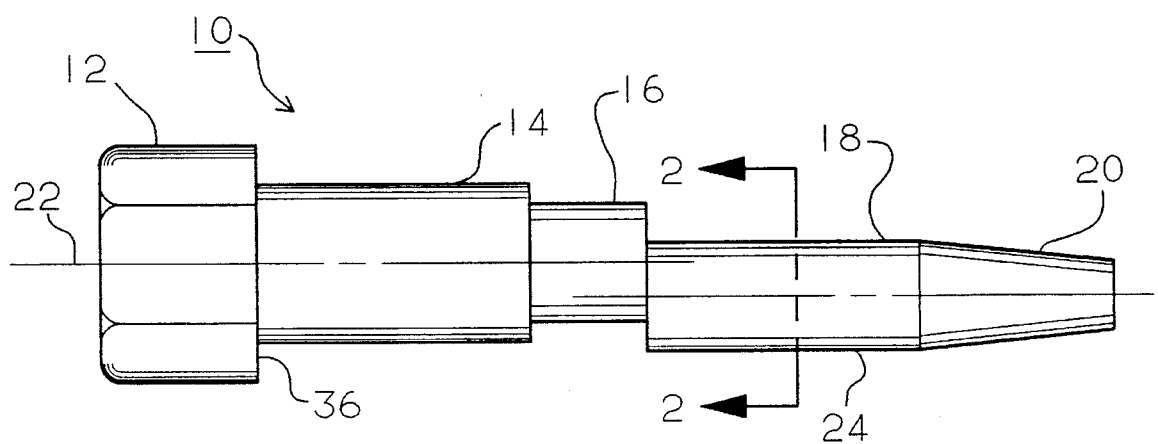
FIG. 1 is a side view of the preferred embodiment of the present invention.
Figure 2:
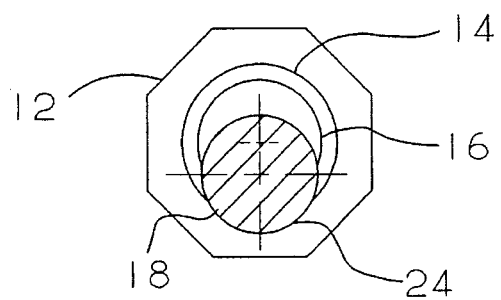
FIG. 2 is a cross-sectional end view showing the non-concentric diameters of the embodiment of FIG. 1.

Referring to the drawings, and particularly FIG. 1, the bolt hole alignment pin of the present invention is generally indicated by numeral 10 and is shown in a free standing position. Alignment pin 10 is generally round in cross-section and comprises a head 12, successive longitudinal portions 14, 16, and 18, conical end portion 20, and central axis 22. In the preferred embodiment, head 12 is of hexagonal cross-section but may be of any cross-section which can be rotated around central axis 22 of alignment pin 10. Longitudinal portion 14 is a pilot portion which provides the primary contact surface when alignment pin 10 is initially inserted through the bolt holes of mating flanges. Portions 14, 16, and 18 have successively decreasing diameters, pilot portion 14 being the largest and portion 18 the smallest. Pilot portion 14 is concentric with and extends from head 12 to longitudinal portion 16. Longitudinal portion 16 is concentric with and extends from pilot portion 14 to portion 18. As can be seen in FIGS. 1 and 2, portion 18 is a cam means comprising surface 24 which is offset from central axis 22 thereby operating as a cam when head 12 is rotated about central axis 22 to force misaligned flanges into alignment. Conical end portion 20 facilitates insertion of alignment pin 10 into a bolt hole of a flange.

Figure 3:
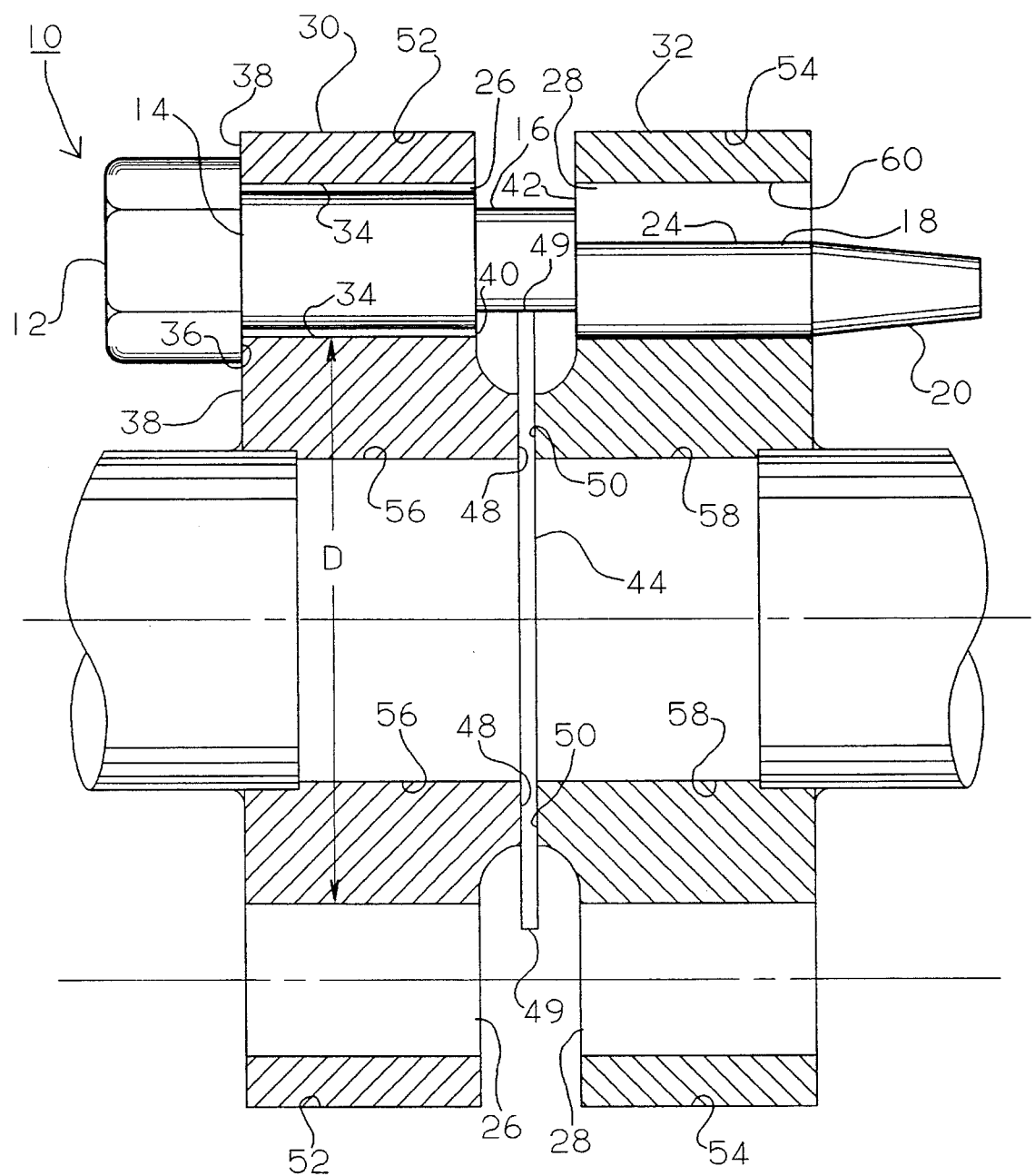
FIG. 3 is a cross-sectional view of the alignment tool inserted in the bolt holes of mating flanges with the tool in the locked position and the flanges aligned.

FIG. 3 shows alignment pin 10 disposed in one pair of a plurality of pairs of corresponding bolt holes 26 and 28 disposed in circles around the circumference of mating flanges 30 and 32. Each bolt hole circle has an inside diameter D corresponding to the inner edges of bolt holes 26,28. When alignment pin 10 is inserted through a pair of corresponding bolt holes 26,28 of mating flanges 30,32, the diameter of pilot portion 14 is sufficient to slip fit bolt hole 26. The diameter of head 12 is larger than the diameter of bolt hole 26 so that full insertion of alignment pin 10 in a pair of bolt holes 26,28 is achieved when the inner face 36 of head 12 adjacent pilot portion 14 contacts the outer face 38 of mating flange 30. Pilot portion 14 and cam means 18 have lengths substantially equal to the thicknesses of mating flanges 30,32. With alignment pin 10 fully inserted, pilot portion 14 is disposed in bolt hole 26, longitudinal portion 16 is disposed between the inner openings 40,42 of bolt holes 26,28, and cam means 18 is disposed in bolt hole 28. Longitudinal portion 16 has a diameter smaller than pilot portion 14 to allow for the outer diameter of gasket 44 which is slightly larger than the inside diameter D of the bolt hole circle of mating flanges 30,32. Longitudinal portion 16 is a gasket centering means which is used to center gasket 44 on the inner faces 48,50 of mating flanges 30,32. When mating flanges 30,32 are initially brought together, temporary bolts (not shown) are inserted into the lower bolt holes along with nuts loosely screwed on. When required, gasket 44 is then inserted between the flanges and the temporary bolts and nuts are tightened to hold mating flanges 30,32 in substantially parallel relationship. Two bolt hole alignment pins 10 of the preferred embodiment are then inserted into two pairs of corresponding bolt holes 28,30 substantially 90° apart along the bolt hole circle of mating flanges 30,32. As alignment pins 10 are successively rotated through substantially 360°, longitudinal portions 16 of each pin engage the outer edge 49 of gasket 44 forcing it to a centered position on the inner faces 48,50 of mating flanges 30,32. The temporary bolts are then tightened to prevent further movement of gasket 44.

To align mating flanges 30,32, the two alignment pins 10 are now successively rotated until surface 24 of cam means 18 frictionally engages inner surface 60 of bolt hole 28. Rotation of alignment pins 10 causes surface 24 of cam means 18 to sweep through a circle having a diameter substantially the same as or slightly larger than the diameter of pilot portion 14, thereby forcing mating flanges 30,32 into alignment. In practice it has been found that the diameter of the circle swept by surface 24 of cam means 18 can be adjusted by changing the offset of cam means 18 to meet whatever tolerances may be required for flange alignment. The frictional forces between surface 24 of cam means 18 and inner surface 60 of bolt hole 28 and between pilot portion 14 and inner surface 34 of bolt hole 26 lock alignment pins 10 in bolt holes 26,28. In this locked mode, alignment pins 10 prevent any transverse movement of mating flanges 30,32 relative to each other, but allow limited rotation of mating flanges 30,32 relative to each other. The difference between the diameters of pilot portion 14 and bolt hole 26 is sufficient to allow this limited movement which facilitates fit up at the opposite end of pipes which may be connected to either mating flange. Allowable rotation of the flanges relative to each other is approximately 2° or less in the locked mode without affecting alignment of the mating flanges.

After mating flanges 30,32 are in alignment, the temporary bolts are removed and permanent bolts (not shown) installed in their places. With the permanent bolts installed, mating flanges 30,32 are in a fixed relationship relative to each other and alignment pins 10 are removed and replaced by permanent bolts, Alignment pins 10 are taken out of their locked mode by rotating each pin 10 until surface 24 is no longer in frictional engagement with inner surface 60. Each pin 10 is then easily removed from bolt holes 26,28.

Figure 4:
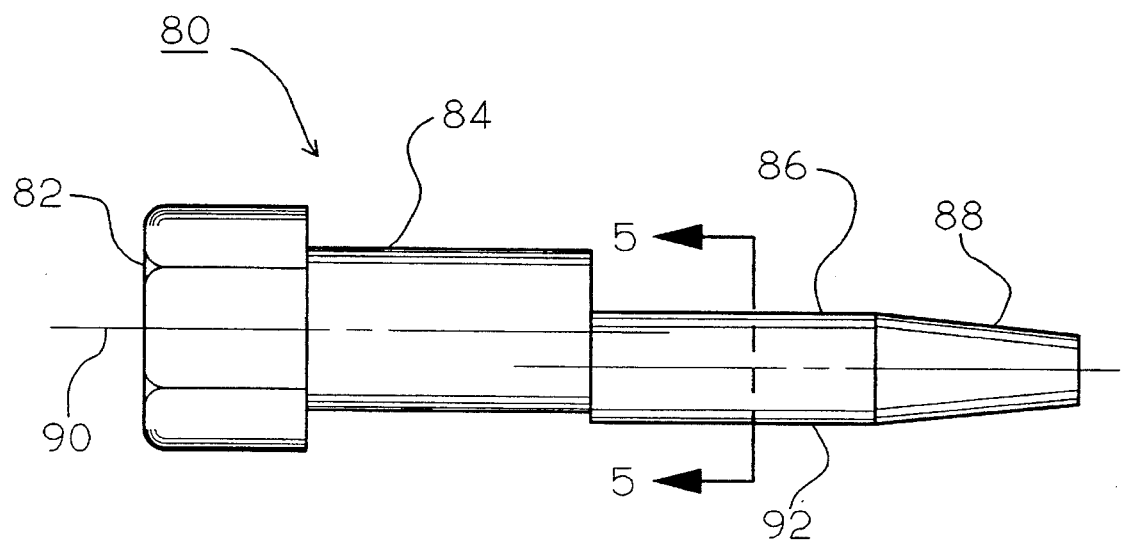
FIG. 4 is a side view of an alternate embodiment of the present invention.
Figure 5:
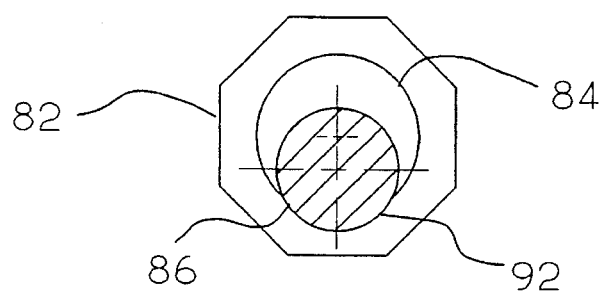
FIG. 5 is a cross-sectional end view of the embodiment of FIG. 4.

FIGS. 4 and 5 show an alternate embodiment of the present invention that is used to align mating flanges when a gasket is not required. In FIG. 4, the bolt hole alignment pin of this alternate embodiment is generally indicated by numeral 80 and is shown in a free standing position. Alignment pin 80 is generally round in cross-section and comprises a head 82, successive longitudinal portions 84 and 86, conical end portion 88, and central axis 90. As shown in FIG. 5, head 82 is preferably of hexagonal cross-section but may be of any cross-section which can be rotated around central axis 90 of alignment pin 80. Portion 84 is a pilot portion of diameter sufficient to slip fit a bolt hole of a flange and provides the primary contact surface when alignment pin 80 is initially inserted through the bolt holes of mating flanges. Pilot portion 84 is concentric with and extends from head 82 to longitudinal portion 86. Portion 86 is a cam means having a smaller diameter than pilot portion 84, an outer surface 92, and is offset from central axis 90. Conical end portion 88 facilitates insertion of alignment pin 10 through the bolt holes of mating flanges. When alignment pin 80 is inserted through a pair of corresponding bolt holes of misaligned mating flanges and head 82 is rotated around central axis 90, the surface 92 of cam means 86 sweeps through a circle having a diameter substantially the same as or slightly larger than the diameter of pilot portion 84, thereby forcing the mating flanges into alignment.

I claim:

1. A tool for use in aligning a pair of mating flanges, said flanges having a central axis, mating faces, and a plurality of bolt holes disposed in a circle around the circumference of the flanges, the tool comprising:

a pin round in cross-section and having a head, a central axis, successive longitudinal portions of decreasing diameter extending from said head along said central axis; and one of said longitudinal portions comprising a cam means for aligning said mating flanges when said head is rotated around said central axis.

2. The tool of claim 1 wherein said mating flanges are pipe flanges and wherein said successive longitudinal portions comprise at least a pilot portion, a cam means, and a conical end portion, said pilot portion having a first diameter sufficient to slip fit said bolt holes.

3. The tool of claim 2 wherein said cam means comprises an offset longitudinal portion having an outer surface;

said offset longitudinal portion having a longitudinal axis offset from said central axis; and said conical end portion extending from said offset longitudinal portion.

4. The tool of claim 3 wherein said outer surface of said offset longitudinal portion sweeps through a circle having a diameter substantially the same as the diameter of said pilot portion when said pin is rotated about said central axis.

5. The tool of claim 4 wherein the diameter of said swept circle is slightly larger than the diameter of said pilot portion.

6. The tool of claim 4 wherein, when said pin is positioned in misaligned mating bolt holes and said pin is rotated about its central axis, said offset longitudinal portion forces said bolt holes into alignment.

7. The tool of claim 5 wherein, when said pin is positioned in misaligned mating bolt holes and said pin is rotated about its central axis, said offset longitudinal portion forces said bolt holes into alignment.

8. The tool of claim 3 wherein said cam means further comprises an unlocked mode when said pin is in one position, and a locked mode when said head is rotated to align said mating flanges.

9. The tool of claim 8 wherein said outer surface of said offset longitudinal portion of said cam means frictionally engages an inner surface of one of said bolt holes in said locked mode, said frictional engagement restraining said mating flanges from moving transversely relative to each other and allowing limited rotation of said mating flanges relative to each other.

10. The tool of claim 9 wherein said limited rotation of said mating flanges relative to each other is less than 2° around said central axis of said mating flanges.

11. A tool for use in aligning a pair of mating flanges, said flanges having a central axis, mating faces, outside diameters, and a plurality of bolt holes disposed in a circle around the circumference of the flanges, the tool comprising:

a pin round in cross-section and having a head, a central axis, first and second longitudinal portions, a cam means for aligning said mating flanges, and a conical end portion;

said first longitudinal portion concentric with and extending from said head and having a first diameter;

said second longitudinal portion concentric with and extending from said first longitudinal portion;

said cam means comprising a third longitudinal portion having an outer surface extending from said second longitudinal portion, said third longitudinal portion offset from said central axis of said pin; and said conical end portion concentric with and extending from said third longitudinal portion.

12. The tool of claim 11 wherein said mating flanges are pipe flanges and include a flat annular gasket between said mating faces and wherein said first longitudinal portion comprises a pilot portion and said second longitudinal portion comprises a gasket centering means, said pilot portion having a first diameter sufficient to slip fit said bolt holes.

13. The tool of claim 12 wherein said gasket centering means has a second diameter smaller than said first diameter for engaging an outer edge of said gasket, said gasket having an outer diameter slightly greater than the inside diameter of said bolt hole circle.

14. The tool of claim 13 including, said offset longitudinal portion having a third diameter smaller than said second diameter, and said offset longitudinal portion operating as a cam for engaging an inner surface of one of said bolt holes in one said mating flange to align said mating flanges when said head is rotated around said central axis of said pin.

15. The tool of claim 14 wherein the length of said offset longitudinal portion is substantially equal to the thickness of said one mating flange.

16. The tool of claim 11 wherein said cam means comprises an unlocked mode when said head is in one position, and a locked mode when said head is rotated to align said mating flanges.

17. The tool of claim 16 wherein said outer surface of said offset longitudinal portion frictionally engages an inner surface of one of said bolt holes in said locked mode, said frictional engagement restraining said mating flanges from moving transversely relative to each other and allowing limited rotation of said mating flanges relative to each other.

18. The tool of claim 17 wherein said limited rotation of said mating flanges relative to each other is about 220 around said central axis of said mating flanges.

19. The tool of claim 11 wherein said outer surface of said offset longitudinal portion sweeps through a circle having a diameter substantially the same as said first diameter of said first longitudinal portion when said pin is rotated about its central axis.

20. The tool of claim 19 wherein the diameter of said swept circle is slightly larger than said first diameter of said first longitudinal portion.

21. The tool of claim 19 wherein, when said pin is positioned in misaligned mating bolt holes and said pin is rotated about its central axis, said offset longitudinal portion forces said bolt holes into alignment.

22. The tool of claim 20 wherein, when said pin is positioned in misaligned mating bolt holes and said pin is rotated about its central axis, said offset longitudinal portion forces said bolt holes into alignment.

23. A method of aligning a pair of mating flanges having mating faces, outside diameters, and a plurality of bolt holes disposed in a circle around the circumference of the flanges comprising:

positioning said mating flanges such that said plurality of bolt holes of one of said mating flanges are in relative correspondence with said plurality of bolt holes of said other mating flange;

holding said flanges such that their mating faces are substantially parallel;

inserting a first bolt hole alignment tool through a first pair of corresponding bolt holes of said mating flanges;

inserting a second bolt hole alignment tool through a second pair of corresponding bolt holes of said mating flanges, said first and said second bolt hole alignment tool each comprising a headed pin with a central axis, a pilot portion, and a cam means, said cam means comprising an offset longitudinal portion having an outer surface and a longitudinal axis offset from said central axis;

rotating said first bolt hole alignment tool about its said central axis;

sweeping said outer surface of said offset longitudinal portion through a circle having a diameter substantially the same as or slightly larger than the diameter of said pilot portion;

forcing said outside diameters of said mating flanges adjacent said first alignment tool into alignment; and repeating said rotating, sweeping, and forcing steps with said second bolt hole alignment tool.

24. The method of claim 23 wherein the step of holding said flanges such that their mating faces are substantially parallel comprises:

inserting a plurality of temporary bolts and nuts through said plurality of corresponding bolt holes of said mating flanges; and tightening said temporary bolts and nuts to hold said mating faces of said mating flanges in substantially parallel relationship prior to inserting said bolt hole alignment tools.

25. The method of claim 23 wherein said first and second pairs of corresponding bolt holes are substantially 90° apart along a circular arc passing through said plurality of bolt holes.

26. The method of claim 23 further including:

positioning a gasket between said mating faces of said mating flanges prior to inserting said bolt hole alignment tools;

inserting said first and said second bolt hole alignment tools through said first and said second pair of corresponding bolt holes of said mating flanges, said bolt hole alignment tools further comprising gasket centering means;

engaging an outer edge of said gasket with said gasket centering means of said bolt hole alignment tool; and successively rotating said first and said second bolt hole alignment tools through substantially 36020 to center said gasket on said mating faces of said mating flanges prior to aligning said outside diameters of said mating flanges.

* * * * *